R. HALE.
Wire-Band Cutter.

No. 201,006. Patented March 5, 1878.

WITNESSES:
C. Clarence Poole
Bertram Zevely

INVENTOR:
Robert Hale
per attys.
A. H. Evans & Co.

UNITED STATES PATENT OFFICE.

ROBERT HALE, OF MINNEAPOLIS, MINNESOTA.

IMPROVEMENT IN WIRE-BAND CUTTERS.

Specification forming part of Letters Patent No. 201,006, dated March 5, 1878; application filed February 12, 1878.

*To all whom it may concern:*

Be it known that I, ROBERT HALE, of Minneapolis, Minnesota, have invented a new and useful Improvement in Wire-Band-Cutting Implements, of which the following is a clear, full, and exact description, reference being had to the accompanying drawings, making a part of this specification, in which—

Figure 1:
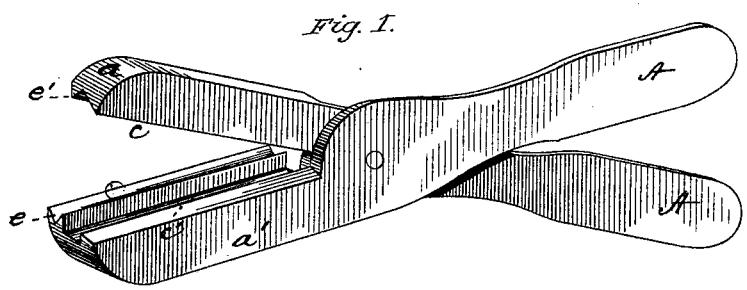
Figure 2:
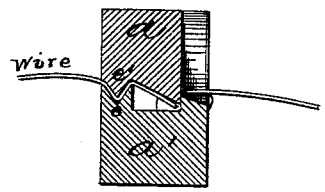

Figure 1 is a perspective view of my improved implement. Fig. 2 is a transverse section.

My invention relates to that class of band-cutters used in clipping the wire bands around sheaves of wheat as they are fed to a thrashing-machine, and is designed to prevent the wire from passing with the grain into the machine, where it is more or less liable to be severed into short pieces and mix with straw, thus endangering the lives of the stock feeding on the straw.

To avoid this serious difficulty is the object of my present invention, which consists in attaching to the cutting-blades of the implement grooved jaws for catching and bending the wire in advance of the completion of the cut, so as to have a positive hold on the wire, whereby it may be pulled out from the grain and thrown to one side, leaving the straw clear and free from all metallic splinters, all as hereinafter more fully described and claimed.

To enable others skilled in the art to make and use my invention, I will proceed to describe the exact manner in which I have carried it out.

In the drawings, A A represent two handles, pivoted together like ordinary shears, and provided with the jaws $a$ $a'$ and the cutting-edges $c$ $c'$. The one jaw is grooved at $e$, so as to receive the V-shaped projection $e'$ on the opposite jaw, between which the wire is caught and bent in advance of the action of the cutting-edges $c$ $c'$, as the grooved portion $e$, extending above the cutting-edge, comes in contact with the projection $e'$ before the cutting-edges are brought into contact.

It is evident from this description of my implement that when the operator clips the wire band he will have a positive hold on one end of the wire, and will be able, with ease and certainty, to withdraw the wire and prevent its mingling with the straw, and thus avoid all danger of injuring the stock.

I am aware that wire-band-cutting shears have been made designed to catch and hold the wire, and therefore I do not claim such, broadly; but, Having thus explained my invention, what I claim as new, and desire to secure by Letters Patent, is—

The wire-band-cutting implement, as described, consisting of handles A A, provided with a grooved jaw, $e$, and a jaw having a projection, $e'$, fitting in the groove, and the cutting-edges $c$ $c'$, substantially as and for the purpose set forth.

ROBERT HALE.

Witnesses:
    W. F. MORSELL,
    BARTRAM ZEVELY.